US007698382B2

(12) United States Patent
Amiens

(10) Patent No.: US 7,698,382 B2
(45) Date of Patent: Apr. 13, 2010

(54) SYSTEM AND METHOD FOR REMOTE CONTROLLING EQUIPMENT WITH THE AID OF AT COMMANDS, AND CORRESPONDING DEVICE, RADIOCOMMUNICATION MODULE, AND SET OF COMMANDS

(75) Inventor: Christian Amiens, Petit-Bourg (FR)

(73) Assignee: Wavecom, Issy les Moulineaux (FR)

( * ) Notice: Subject to any disclaimer, the term of this patent is extended or adjusted under 35 U.S.C. 154(b) by 640 days.

(21) Appl. No.: 10/561,373

(22) PCT Filed: Jun. 16, 2004

(86) PCT No.: PCT/FR2004/001499

§ 371 (c)(1),
(2), (4) Date: Sep. 7, 2006

(87) PCT Pub. No.: WO2004/114625

PCT Pub. Date: Dec. 29, 2004

(65) Prior Publication Data

US 2007/0213042 A1    Sep. 13, 2007

(30) Foreign Application Priority Data

Jun. 16, 2003    (FR)    ................................. 03 07244

(51) Int. Cl.
*G06F 15/16*    (2006.01)
*G06F 15/173*    (2006.01)
*H04M 3/00*    (2006.01)

(52) U.S. Cl. ........................ 709/219; 455/418; 709/238

(58) Field of Classification Search ......... 709/217–219, 709/230, 238, 224; 455/418
See application file for complete search history.

(56) References Cited

U.S. PATENT DOCUMENTS

| 5,490,134 | A  | * | 2/1996  | Fernandes et al. ............ 370/466 |
| 7,103,511 | B2 | * | 9/2006  | Petite ........................ 702/188 |
| 2002/0199121 | A1 | * | 12/2002 | Stanford-Clark ............ 713/201 |
| 2003/0129944 | A1 | * | 7/2003  | Chang et al. .................. 455/41 |

OTHER PUBLICATIONS

Andy Stanford-Clark, WebSphere MQ Development, IBM Software Group, Integrating Monitoring and Telemetry Devices as Part of Enterprise Information Resources, Mar. 2002, pp. 1-13.*
Wavecom, "Wavecom Annonce Open at 2.0," Communiques de Presse, XP-002283468, Apr. 2003, pp. 1.
Wavecom, "Wavecom Releases Open at 2.0, Enhanced Development Tool Offers Greater Flexibility for Wireless Application Developers," XP-002283468, www.wavecom.com, Apr. 23, 2003, pp. 1-2.

* cited by examiner

*Primary Examiner*—Joseph E Avellino
*Assistant Examiner*—Harunur Rashid
(74) *Attorney, Agent, or Firm*—David D. Brush; Westman, Champlin & Kelly P.A.

(57) ABSTRACT

A system is provided for remote controlling equipment, which allows at least one server and at least one remote piece of equipment to be interconnected according to the MQIsdp protocol. The system associates at least one of the remote pieces of equipment with radio communication device that emits and receives AT-type commands issued by and/or addressed to an external application which is used by the distance piece of equipment. The radio communication device is provided with a set of specific AT commands for exchanging data with at least one server that uses the MQIsdp protocol such that said server/s and the remote piece/s of equipment can be interconnected via the radio communication device without the distant pieces of equipment having to know the MQIsdp protocol.

20 Claims, 8 Drawing Sheets

SYSTEM AND METHOD FOR REMOTE CONTROLLING EQUIPMENT WITH THE AID OF AT COMMANDS, AND CORRESPONDING DEVICE, RADIOCOMMUNICATION MODULE, AND SET OF COMMANDS

CROSS-REFERENCE TO RELATED APPLICATION

This Application is a Section 371 National Stage Application of International Application No. PCT/FR2004/001499, filed Jun. 16, 2004 and published as WO 2004/114625 A2 on Dec. 29, 2004, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The domain of the disclosure is remote control of equipment, and particularly equipment with limited data processing resources. Thus, the disclosure is applicable for example to remote data recording systems, for example on water, gas or electricity meters, and more generally to telemetry, order monitoring and more generally Machine to Machine (M to M) systems.

BACKGROUND OF THE DISCLOSURE

Many solutions already exist for performing such operations. They have generally been developed specifically for a given application. In other words, they are "proprietary" solutions that are difficult to adapt to other applications.

There is also a protocol developed by the IBM and ARCOM Control Systems companies (registered trademarks), known as the "MQIsdp Messaging" technology. This technique proposes a communication protocol between one or several items of equipment with limited resources, and one or several servers, using a TCP/IP link.

SUMMARY OF THE DISCLOSURE

However, even with this specific protocol, special processing means (microprocessors, memories, etc.) have to be added to the equipment so as to set up a dialog with these remote servers, depending on the required MQIsdp format. The connection between the equipment and the server may use a telephone type link using a modem.

However, in many applications, it would be desirable to be able to manage without a wire telephone link. In this case, radiocommunication means could be envisaged, for example according to the GSM or GPRS standard.

In this case, radiotelephone equipment would be used to perform the modem function. However, according to prior art, it is necessary to associate special and proprietary data processing means with the equipment to set up and exchange data with the server.

This aspect is a very important limitation to the development of the applications mentioned above, and to many other applications with which the MQIsdp protocol could be used.

SUMMARY

One particular aspect of an embodiment of the invention is to overcome this disadvantage with prior art.

It should be noted that the fact that this problem has been identified is itself part of an embodiment of the invention. At least some of those skilled in the art are convinced that it is absolutely necessary to equip terminal equipment with sufficient processing means, and will never consider reducing or eliminating these processing means.

However, one aspect of an embodiment of the invention is to simplify the processing in the equipment, and to avoid the need for this equipment to have complex and expensive means such as a microprocessor.

Another aspect of an embodiment the invention is to propose a simple and generic technique to easily and efficiently set up a dialog with a server using the MQIsdp protocol.

Yet another aspect of an embodiment of the invention is to provide such a technique for setting up a connection between servers and equipment by radiotelephone link in a simple, standardised and inexpensive manner.

Another aspect of an embodiment of the invention is to provide such a technique to develop a large number of applications, without it being necessary to develop specific applications each time.

Another aspect of an embodiment of the invention is to provide such a technique in which there is no need to know the MQIsdp protocol in the developed applications.

Yet another aspect of an embodiment of the invention is to provide such a technique that is technically simple and upgradeable and adaptable to various situations (for example the amount of data to be exchanged) and to any future changes that are made.

These aspects and others that will appear more clearly in the following, are achieved using a system for remote control of equipment enabling interconnection between at least one broker and at least one remote equipment using the MQIsdp protocol.

According to an embodiment of the invention, radiocommunication means capable of sending and receiving AT type commands sent by and/or sent to an external application used by the said remote equipment are associated with at least one of the said remote equipment, the said radiocommunication means being provided with a set of special AT commands for exchanging data with at least one broker using the said MQIsdp protocol, so as to enable an interconnection between the said server(s) and the said remote equipment through the said radiocommunication means, without requiring knowledge of the said MQIsdp protocol in the said remote equipment.

Thus, it is easy and simple to manage data exchanges without the need to develop special applications or to associate important means (particularly microprocessor and memory) with a terminal. Neither the terminal nor the application needs to know the MQIsdp protocol. The radiocommunication means manage these aspects. The application only needs to know the new AT commands.

Advantageously, at least in a first mode, the said radiocommunication means only manage signalling of a data exchange, the said data being transferred directly from remote equipment to a server, or vice versa.

Preferably, at least in a second mode, the said radiocommunication means manage signalling of a data exchange and transfer of the said data, the data being temporarily stored in at least one buffer memory.

In this case, the size of the said buffer memory(ies) can advantageously be parameterable.

According to one advantageous embodiment, the said system operates in the said first mode when the size of the said buffer memory(ies) is equal to 0, and otherwise in the said second mode.

Thus, a simple and efficient means is obtained for performing two functions (mode selection and queue sizing) with a single command.

In one advantageous embodiment of the invention, the said radiocommunication means comprise a radiocommunication module comprising all radio frequency and base band processing means on the same substrate, together with means of managing the said AT commands.

In particular, the said radiocommunication means can include the said MQIsdp protocol in the form of an "open-AT" application defining the said set of special AT commands.

Advantageously, the said set of special AT commands includes commands for:
connecting to one of the said servers;
sending messages;
receiving messages.

Preferably, at least some of the said special AT commands are organized so as to be able to perform at least two functions and/or to act on at least two distinct aspects, as a function of a predefined configuration.

This can strongly reduce the number of necessary commands, while performing all necessary operations taking account of any future developments.

Thus in one preferred embodiment, the said set of commands only includes 8 commands.

The said set of special AT commands advantageously includes at least one configuration command used to define communication parameters with one of the said servers.

Preferably, the system uses a single configuration command (+WSPGSET) for configuration of radiocommunication aspects and the general configuration of aspects related to the MQIsdp protocol.

In particular, the said configuration command can be used to select one of at least two transmission modes (GSM or GPRS).

Advantageously, the system uses three configuration commands:
a general communication configuration command (+WSPGSET);
a connection configuration command (+WSPCSET), particularly used to specify the coordinates of a server;
a configuration command for the "will" configuration message (+WSPWMS), particularly to specify the channel to which a message will be sent.

Preferably, it also uses at least one general communication command for sending and/or receiving messages using the MQIsdp protocol.

Thus, five general communication commands can advantageously be used:
a command for specifying an MQIsdp context (+WSPDCONT);
a command for managing a connection with a server (+WSPCONM);
a command for sending a message (+WSPSMSG);
a command for receiving a message (+WSPRMSG);
an administration command, used to do a reset and/or return to the default values of a set of parameters (+WSPPA).

Advantageously, it also uses at least one query command by an external application, preferably two query commands by an external application, on the following in turn:
the current state of the connection (+WSPICON);
reception and/or sending of a message (+WSPIMSG).

An embodiment of invention also relates to the method for remote control of equipment used by a system as described above. It enables interconnection between at least one server and at least one remote equipment according to the MQIsdp protocol by associating at least one of the said remote items with radiocommunication means capable of sending and receiving AT type commands sent by and/or to be sent to an external application used by the said remote equipment, and by using a set of special AT commands in the said radiocommunication means for exchanging data with at least one server using the said MQIsdp protocol. This enables an interconnection between the said server(s) and the said remote equipment through the said radiocommunication means, without requiring additional processing and/or data formatting means in the said remote equipment.

An embodiment of invention also relates to radiocommunication devices and modules comprising radiocommunication means used in such an equipment remote control system.

A further embodiment of the invention relates to sets of AT commands used in an equipment remote control system, used to exchange data with at least one server using the said MQIsdp protocol.

Other special features and advantages of one or more embodiments of the invention will become clearer after reading the following description of a preferred embodiment of the invention, given as a simple illustrative and non-limitative example and appended figures.

DETAILED DESCRIPTION OF ILLUSTRATIVE EMBODIMENTS

1. Reminders about the MQIsdp Protocol
(Registered Trademark)

The MQIsdp (WebSphere MQ Integrator SCADA device protocol) is an open standard developed by IBM and Arcom Control Systems (registered trademarks), to enable data exchanges (in the form of messages) from generally inexpensive remote devices (or terminals) with little processing power, to a WebSphere MQ Integrator by TCP/IP server, also called a broker in the following, and vice versa.

MQIsdp (also called Wavecom SCADA in the following) is a data (message) transfer protocol based on a publish/subscribe type communication model freely available on Internet. It may be described as being a simple agnostic data management layer above the TCP/IP protocol, for message management and acknowledgements of reception necessary to assure reliable delivery of the message.

In the publish/subscribe communication model, data are exchanged between a data producer/consumer (the client) and a message broker (the server). The message broker may be considered as being a multi-protocol switching hub for the application protocol that receives the messages, and it transforms them, reformats them, etc. into other structures as a function of a data model defined by the user.

Finally, any transformed messages may be sent (published) by the broker to subscriber clients (zone device, ERP, SAP, Oracle, SQL, etc.) using appropriate client cards. Obviously, the broker can also publish messages that do not originate from a client.

The message broker manages all messages input to and output from an item. A client publishes messages in/with an item or subscribes to messages from/by an item identifying the message flow from the message broker to which or from which the message is to be published.

The MQIsdp specification defines a set of very simple messages including "connect", "disconnect", "publish", "subscribe", and "unsubscribe".

2. Principles of an Embodiment of the Invention 2.1 General

Therefore, one or more embodiments of the invention relate to a new approach for remote control of equipment, particularly based on the use of a set of special AT type commands, enabling an external application to manage data exchanges between a remote terminal and a server, through radiocommunication links (for example a Wismo type (registered trademark) module), without the application knowing the MQIsdp protocol used by the server. This aspect is managed by radiocommunication means, and for example acknowledgements described in the MQIsdp protocol.

Figure 1:
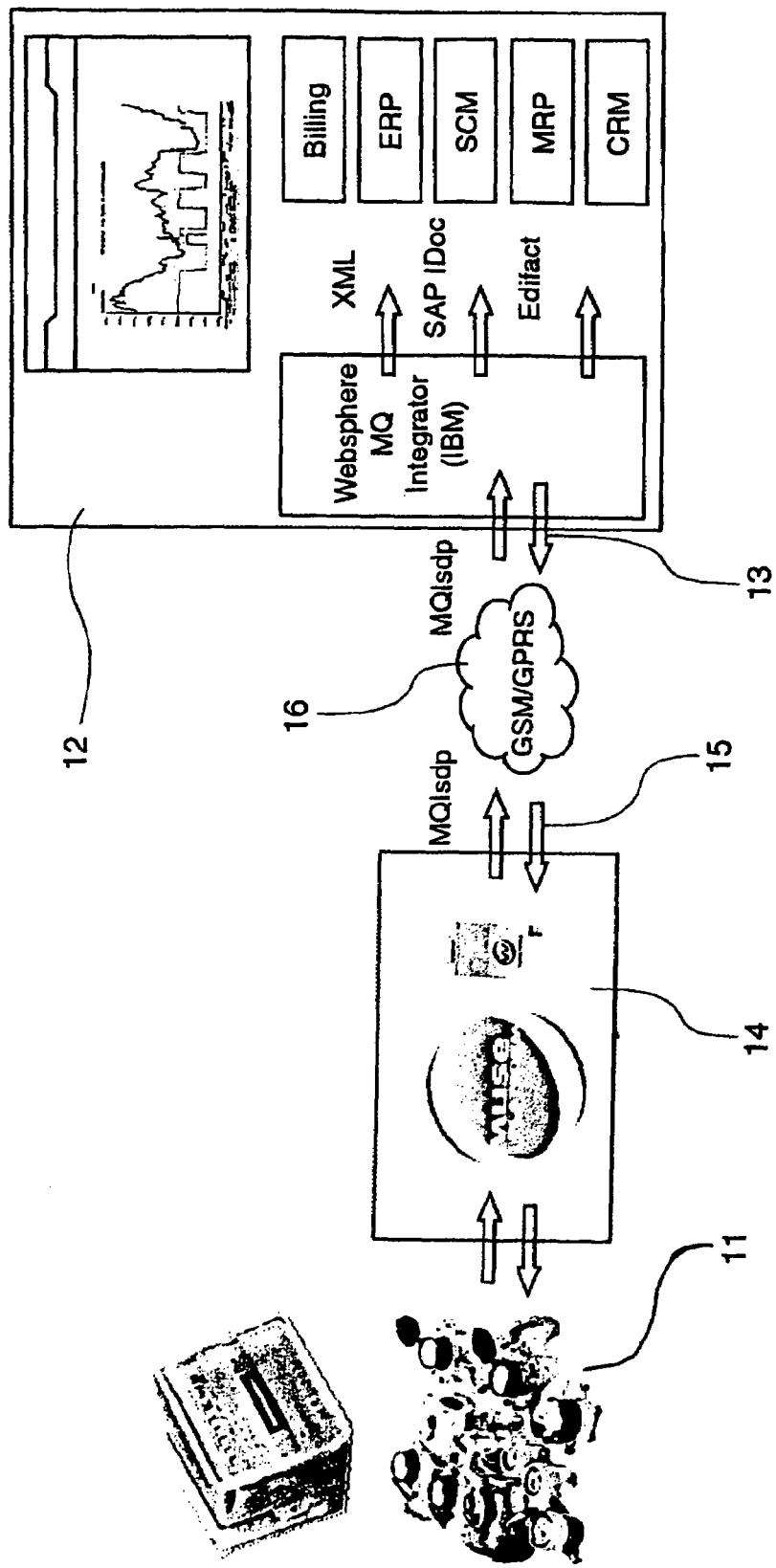
FIG. 1 shows an example of a system in which an embodiment of the invention could be used.

FIG. 1 is a simplified illustration of the principle of an embodiment of the invention. The objective is to have any type of remote machine, for example measurement instruments 11, communicate with one or several applications hosted on servers 12, capable of receiving data 13 using the MQIsdp protocol, and to transform, process or transmit these data.

According to this embodiment, the remote terminals (or machines) 11 are associated with radiocommunication means 14, for example in the form of a Wismo module (registered trademark) particularly embedding development tools distributed by the applicant under the "Muse platform" trademark).

2.2 Module Concept

As a reminder, it should be noted that most radiocommunication devices conventionally comprise a set of electronic components arranged on a printed circuit. These various components are designed to perform the various necessary functions, from reception of a RF signal until generation of an audible signal (in the case of a radiotelephone) and vice versa. Some of these functions are analogue and others are digital.

Manufacturing of these radiocommunication devices is an important subject of research. Three objectives are aimed at, that are difficult to reconcile: miniaturising devices, increasing features and simplifying assembly. It is known that installation of different components on a printed circuit is a relatively complex operation, since many components have to be arranged on a very restricted surface area, due to miniaturization requirements.

Therefore, the design of these systems is complex, since it also requires a combination of various components, often from multiple sources, that have to be made to operate together, respecting the specific features of each. Furthermore, after assembling the set of components, calibration and test phases that are frequently long and complex are necessary to guarantee correct operation of the device.

Finally, despite the reduction in size of some components, the assembly occupies a certain surface area that is difficult to reduce.

The holder of this patent application has proposed a method of overcoming some of these disadvantages, consisting of grouping all or at least some of the functions of a digital radiocommunication device in a single module.

Such a module is in the form of a single compact housing, preferably shielded, that device manufacturers can integrate directly without needing to take account of a multitude of components.

This module (also sometimes called a "macro-component") is actually formed by grouping several components on a substrate, so as to be implanted in the form of a single element. It includes essential components and software necessary for operation of a communication terminal using radio-electrical frequencies. Therefore, there is no longer a set of complex steps for the conceptual design and validation of this terminal. All that is necessary is to reserve the space necessary for the module.

Therefore, such a module can be used to easily and quickly integrate all components into wireless terminals in an optimised manner (portable telephones, modems or any other application using a wireless standard).

Furthermore, since this module contains all essential functions and has been designed as a complete unit, calibration and test problems no longer arise in the same manner, or are at least very much simplified.

Thus, modules distributed by the holder of this patent application are fully tested both in terms of hardware and software on most networks on which they could be used later. Furthermore, the module advantageously encompasses industrial proprietary aspects (since all functions have been grouped together, the module manufacturer manages the corresponding patent right aspects) and technical support aspects.

2.3 AT Commands

The principle of using AT commands is already known. For example, it is described in patent document FR-99 13645, and in various specifications distributed by the applicant and that can be referred to for further information if necessary.

2.4 New AT Commands

This module 14 is capable of managing a small number of simple AT commands, enabling a simple and efficient dialog with an external application associated with a terminal. It makes the transformation to the MQIsdp format and manages sending and receiving of data 15 using this protocol, in a manner transparent for the application.

Thus, the data exchange can be made using radio waves 16, for example according to the GSM or GPRS standard. Seen from the server 12, information is in the MQIsdp format. There is no need for terminals 11 to know this protocol, they only need to know a few AT commands. It is thus easy and inexpensive to implement an external application at low cost in (or adjacent to) a terminal without the need to provide a microprocessor and memories, and a dedicated application.

As will be seen later, the proposed AT commands may be limited to 8, although they can be upgraded.

Two data transfer modes are proposed:
- data transit through the module 14. These data are temporarily stored in buffers (buffer memories), the size of which can be configured as a function of needs;
- data are transmitted directly between the terminal and the server, without being stored in memory in the module 14, the module 14 only managing all signalling aspects (opening and closing of the connection, acknowledgements, etc.).

The first case could correspond to the most frequent case of small messages, and the second case to the transfer of large files, as is allowed for in the MQIsdp protocol. It is thus possible to manage everything through the module, without adding any external memory and intelligence, while enabling data transfers with a volume greater than the storage capacity of the module.

Advantageously, a single command can be used for sizing of buffers and changing from one mode to the other (the second mode corresponding to a zero value).

Figure 2:
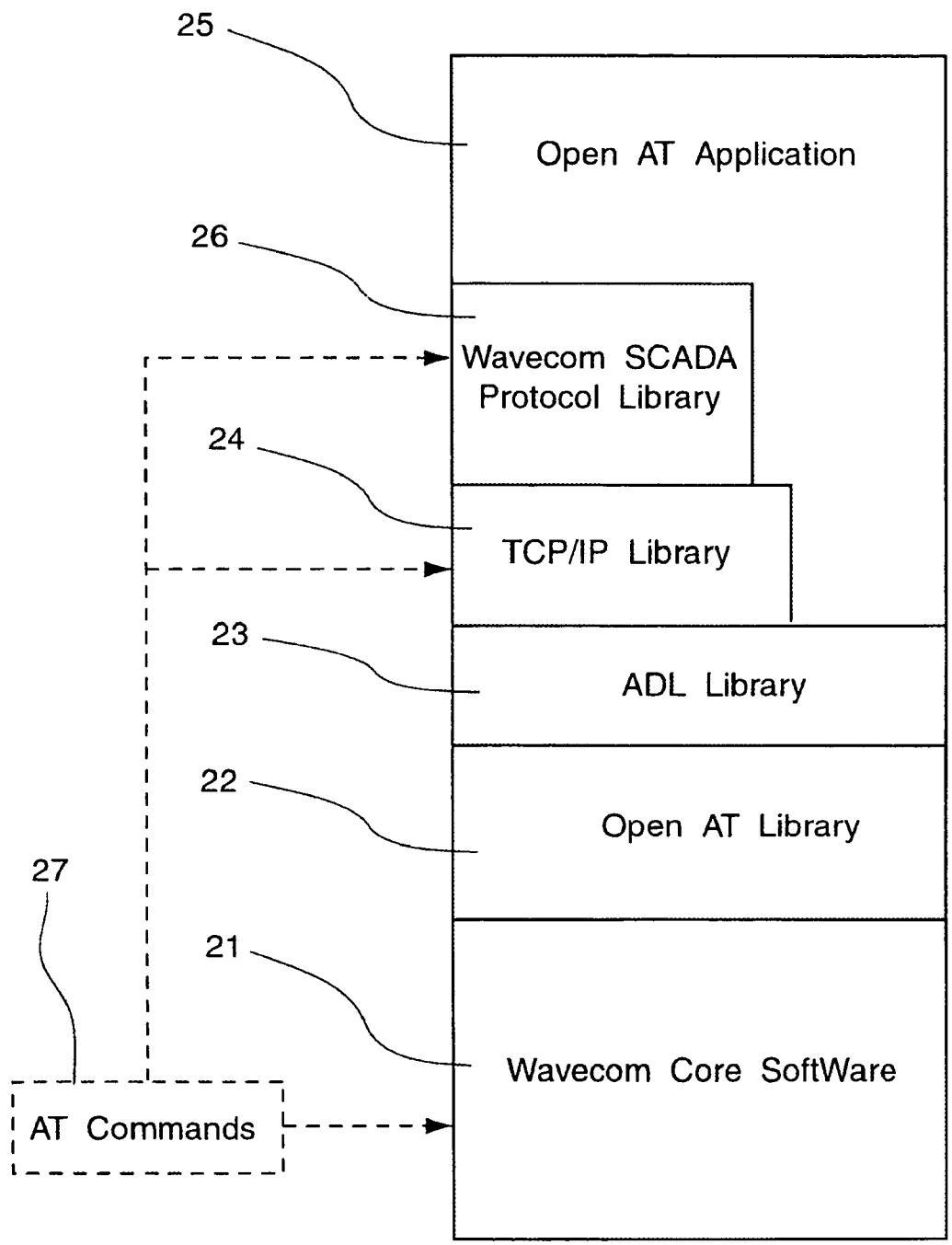
FIG. 2 shows an example of how the MQIsdp protocol can be integrated in an Open-AT application.

FIG. 2 shows a simplified example of a software architecture that could be used in the module 14.

Such a module 14 usually comprises:
a basic software layer 21 (Wavecom Core SoftWare);
an Open AT library 22;
an ADL library 23;
a TCP/IP library 24;
an application layer 25 (Open AT Application).

According to an embodiment of the invention, a library 26 of special commands (Wavecom SCADA Protocol Library) is provided to communicate using the MQIsdp protocol that is above the TCP/IP library 24.

The AT commands 27 address either the base layer 21, the TCP/IP library 24 or the SCADA library 26 depending on the case.

The proposed interface using AT commands includes only 8 commands in this library 26, capable of fully controlling the MQIsdp protocol and particularly:

possibility of sizing two internal queues for managing incoming and outgoing messages;
possibility of outsourcing management of large messages;
definition of connection contexts;
management of configuration parameters;
management of sending different types of messages by generic command.

3. Detailed Description of an Embodiment of Commands

The following describes AT commands that could be used to control the Wavecom SCADA protocol 26.

3.1 Related Documents

If necessary, the following documents provide useful information:

[1] This document should be read with the "WebSphere MQ Integrator SCADA Device Protocol" datasheet given in Appendix B of the "IBM WebSphere MQ Integrator Programming Guide" reference manual available at the following address:

http://publifp.boulder.ibm.com/epubs/odf/bipval04.pdf

[2] Wavecom AT Commands Interface Guide

Reference: WM_SW_OAT_IFS_001-revision: 009 or more recent versions.

This document describes AT commands managed by the Wavecom product to manage related GSM events or services.

[3] AT Command Interface for TCP/IP

Revision: 1.7

This document describes the parameters and the set of AT commands for configuration and control of superposition of TCP/IP and protocols available on Wavecom products.

3.2 Abbreviations and Definitions

3.2.1 Abbreviations

| | |
|---|---|
| APN | Access Point Name |
| AT: | Attention |
| DNS | Domain Name System |
| ISP | Internet Service Provider |
| ME | Mobile Equipment |
| SCADA | Supervisory Control and Data Acquisition |
| MS | Mobile Station |
| QoS | Quality of Service |

Wavecom core software:
Software layer managing all AT commands so that related GSM events or services can be managed.

3.2.2 Definitions

The terms MS and ME are used for mobile terminals handling GSM services. The word "product" refers to any Wavecom product (particularly a module) handling the AT commands interface.

Symbols:
<CR> carriage return character
<LP> line feed character
[ . . . ] optional parameter of an AT command
< . . . > Parameter name between angle brackets. The angle brackets do not appear on the command line.

3.3 AT Command Syntax

This section defines the format of AT commands, and mechanisms for assignment of default values of their parameters.

3.3.1 Command Line

Commands always begin with the standard "AT+WSP" prefix and finish with the <CR> character.

Optional parameters are indicated between square brackets [ ].

For example: AT+WSPCmd=<Param1>[,<Param2>]

In this example, <Param2> is optional. When the AT+WSPCmd command is executed without <Param2>, the default value of the <Param2> parameter is used.

3.3.2 Information Responses and Result Codes

Responses begin and end with <CR><LF> (except for the format of the ATVO DCE response) and ATQ1 commands (deletion of result code) (see the related document [2]).

If the command syntax is incorrect, the command is returned to the Wavecom central software for processing. In this case, the Wavecom central software returns the "ERROR" message.

If the command syntax is correct but incorrect parameters have been transmitted, the <CR><LF>+WSP ERROR: <Err><CR><LF> response is returned together with appropriate error codes.

If the command line was executed successfully, the <CR><LF>"OK"<CR><LF> string is returned.

3.4 Configuration Commands

Different parameters are necessary to provide the Wavecom product with all information about the initial connection:

The support network used: GSM or GPRS
Timeout parameters
The functional mode of superposition of the Wavecom SCADA protocol
All necessary information about the support network so that a TCP/IP infrastructure can be accessed
The "Will" configuration message for the connection.

3.4.1 +WSPGSET General Parameters a—Description

This command is used to configure all parameters used to select the support network, the different timeouts and the functional mode of the Wavecom SCADA protocol.

b—Syntax

| Command | Possible responses |
|---|---|
| AT + WSPGSET = <Mode>[,<Paramid> [<Value>]] Note: configures or lists all general parameters. | OK Or +WSPGSET: <Paramid>, <Value> OK Or +WSPGSET: <Paramid1>, <Value> +WSPGSET: <Paramid2>, <Value> ... +WSPGSET: <Paramid11>, <Value> OK Or Error codes +WSP ERROR: 4000 +WSP ERROR: 4001 |
| AT + WSPGSET? Note: no action | OK |
| AT + WSPGSET? Note: possible values | +WSPGSET: (list of <Mode> handled), (range of <Paramid> values handled) OK | c—Defined Values

| | | |
|---|---|---|
| <Mode> | 02 | Execution mode |
| | 0 | Assigns the value indicated by <Value> to the parameter defined by <Parameterid> |
| | 1 | Reads the current value of the parameter defined by <Parameterid> |
| | 2 | Reads the current value of all parameters |
| <Value> | (0-32767) | Value of the parameter indicated by <Paramid> |
| <Paramid> | (1-11) | The following table contains the list of the various parameters. |

| Paramid | Parameter name | Description | Format | Specifications | Value by default |
|---|---|---|---|---|---|
| 1 | (BearerSet) | Select GSM/GPRS | Numeric | 0-1 0 GSM (ISP parameters are used for a connection) 1 GPRS (APN parameters are used for a connection) | 0 |
| 2 | <Watchdog> | Number of seconds before the connection is interrupted after a given period with no traffic. The value 0 is used to indicate that the exchange monitoring circuit is missing. | Numeric | (0-1000) | 0 |
| 3 | <RedialCount> | Number of unsuccessful connection attempts before terminating the connection attempts activity | Numeric | (0-5) | 0 |

-continued

| Paramid | Parameter name | Description | Format | Specifications | Value by default |
|---|---|---|---|---|---|
| 4 | <NotifyLevel> | Indication level about events related to connnections and/or messages as unsolicited responses (see the chapter on WSP indications) | Numeric | (0-3) 0 No notification 1 Notify connection elements 2 Notify message events 3 Notify all events | 3 |
| 5 | <OutBoxSize> | Size of the Outbox queue in bytes | Numeric | (0-32787) | 32787 |
| 6 | <InBoxSize> | Size of the Inbox queue in bytes | Numeric | (0-32787) | 32787 |
| 7 | <ReadyMsgMode> | This parameter is used when the value 0 is assigned to the Inbox queue. All messages sent by the broker are automatically sent to the external application (see the chapter on WSP indications) | Numeric | (0-1) 0 End of output (by <ctrl>P> Ctrl>C) without the header (DUP, Qos, Retain, etc.) 1 End of output with display of header | |
| 8 | <WillMsgTimer> | Number of seconds waiting for the "Will" message configuration command | Numeric | (1-255) | 5 |
| 9 | <RetryMsgDelay> | Number of milliseconds to retry sending a message | Numeric | (0-255) | 1 |
| 10 | <RetryMsgCount> | Number of unsuccessful attempts to send a message before the send attempt activity is cancelled | Numeric | (1-10) | 0 |
| 11 | <RetryMsgTimer> | Number of seconds waiting for reception of a message | Numeric | (1-233) | 0 | d—Possible Error Codes

| | |
|---|---|
| +WSP ERROR 4000 | Non-activated function of the Wavecom SCADA protocol. This error is returned when the function of the Wavecom SCADA protocol has not been activated in the WISMO module. |
| +WSP ERROR 4001 | Illegal operation. This error is returned when an incorrect parameter is detected. | e—Informative Examples

| Command | Responses |
|---|---|
| AT + WSPGSET = 0,1,1<br>Note: configures the support network | OK<br>Note: GPRS selected |
| AT + WSPGSET = 0,4,2<br>Note: configures the <NotifyLevel> parameter | OK<br>Note: only message events are notified |
| AT + WSPGSET = 0,1,2<br>Note: configures a parameter with an incorrect value | +WSP ERROR:4001<br>Note: illegal operation |
| AT + WSPGSET = 1,1<br>Note: reads the current value of the <BearerSet> parameter | +WSPGSET:1,1<br>OK |
| AT + WSPGSET = 2<br>Note: reads all current values | WSPGSET:1,0<br>WSPGSET:2,0<br>WSPGSET:3,0<br>WSPGSET:4,3<br>WSPGSET:5,32767<br>WSPGSET:6,32767<br>WSPGSET:7,0<br>WSPGSET:8,5<br>WSPGSET:9,1<br>WSPGSET:10,0<br>WSPGSET:11,0<br>OK |
| AT+WSPGSET=?<br>Note: possible values | +WSPGSET:(0-2),(1-111)<br>OK |

3.4.2 Connection Parameters +WSPCSET a—Description

This command is used to configure all connection parameters (by family).

b—Syntax

| Command | Possible responses |
|---|---|
| AT + WSPCSET = <Setting_type>, <param1> [,<param2> [,<param3> [,<param4> [,<param5>]]]]<br>Note: configures all connection parameters. | OK<br>+WSP ERROR:4000<br>+WSP ERROR:4001 |
| AT + WSPCSET?<br>Note: current values of parameters | +WSPCSET = <Setting_type1>, <param1>, <param2>, <param3> [, . . . [,<paramE>]]<br><CR> <LF><br>+WSPCSET = <Setting_type2>, <param1>, <param2>, <param3>[, . . . ],<paramE>]]<br>OK |
| AT + WSPCSET = ?<br>Note: possible values | +WSPCSET:<br>(list of <Setting_type> managed<br>OK | c—Defined Values

| <Settings_type> (0-1) | Parameter category |
|---|---|
| 0 | ISP parameters |
| 1 | APN parameters |

\* IPS parameters (5 parameters) - Settings_type=0
These parameters are used when the GSM support network (given by circuit switching) is selected. See the "Other parameters" section.

| Generic parameter | Parameter | Description | Format | Specifications | Default value |
|---|---|---|---|---|---|
| <Param1> | <PhoneNumber> | ISP telephone number | Numeric string | Maximum length 61 | ** |
| <Param2> | <UserName> | ISP account user name | Alphanumeric string | Maximum length 32 | ** |
| <Param3> | <Password> | ISP account password | Alphanumeric string | Maximum length 32 | ** |
| <Param4> | <DNS1> | Main DNS IP address | Alphanumeric string | IP address format (1.1.1.1-255.255.255.255) | ** |
| <Param5> | <DNS2> | Secondary DNS IP address | Alphanumeric string | IP address format (1.1.1.1-255.255.255.255) | ** |

*APN parameters (3 parameters) - Settings_type=1
These parameters are used when the GPRS support
network is selected. See the "Other parameters" section.

| Generic parameter | Parameter | Description | Format | Specifications | Default value |
|---|---|---|---|---|---|
| <Param1> | <APN> | APN from the GSM operator to supply the GPRS access | Alpha-numeric string | Maximum length 64 | ** |
| <Param2> | <UserName> | APN user name from the GSM operator to supply the GPRS access | Alpha-numeric string | Maximum length 32 | ** |
| <Param3> | <Password> | APN password from the GSM operator to provide access to the GPRS | Alpha-numeric string | Maximum length 32 | ** | d—Possible Error Codes

| | |
|---|---|
| +WSP ERROR 4000 | Non-activated function of the Wavecom SCADA protocol. This error is returned when the function of the Wavecom SCADA protocol has not been activated in the WISMO module. |
| +WSP ERROR 4001 | Illegal operation. This error is returned when an incorrect parameter is detected. | e—Informative Examples

| Command | Responses |
|---|---|
| AT + WSPCSET = 0, "+33612214629", "toto", "secret", "1.2.3.4", "5.6.7.8" Note: configures all ISP parameters | OK Note: new ISP parameters recorded |
| AT + WSPCSET = 0,,,,"1.2.3.4", "1.2.3.5" Note: Only configures the DNS1 and DNS2 parameters | OK Note: new parameters recorded |
| AT+WSPCSET=0","+33612214829", "toto","secret","256.2.3.4","0.0.0.0" Note: configures all parameters with an incorrect parameter (DNS1) | +WSP ERROR:4001 Note: illegal operation |
| AT + WSPCSET = 1, "Orange", "toto", "secret" Note: configures all APN parameters | OK Note: new parameters recorded |
| AT + WSPCSET = 1,, "toto", "secret" Note: only configures the "UserName" and "Password" parameters | OK Note: new parameters recorded |
| AT + XSPCSET = 1, "Orange.fr", "toto", 1 | +WSP ERROR:4001 Note: illegal operation |
| Note: configures all parameters with an incorrect parameter (Password: password) AT + WSPCSET? Note: current values | +WSPCSET:0,"+ 33612214629", "toto", "secret", "1.2.3.4","5.6.7.8" +WSPCSET:1, "Orange.fr", "toto", "secret" OK Note: range of values recorded |
| AT + WSPCSET = ? Note: possible values | +WSPCSET: (0-1) OK Note: values managed |

3.4.3 Parameters for the Will+WSPWMS message a—Description

This command configures all parameters related to the Will message. This command returns +WSP ERROR: 4013 if the value 0 is assigned to the <OutBoxSize> parameter.

b—Syntax

| Command | Possible responses |
|---|---|
| AT + WSPWMS = <Topic> [,<Qos>[,<Retain> [,<PayloadLength>]]]<CR>, Enter <PayloadLength> the number of bytes indicated by the <MsgLength> parameter Or Enter <Payload> <Ctrl>P <Ctrl>C when the <PayloadLength> parameter is not defined Note: configures all parameters in the Will message. | > Or Error code: +WSP ERROR:4000 +WSP ERROR:4001 +WSP ERROR:4002 |
| AT + WSPWMS? Note: returns information from the Will message | +WSPWMS: <Topic>, <Qos>, <Retain> <CR> <LF> <Payload> OK |
| AT + WSPWMS = ? Note: possible values | +WSPWMS: (maximum length of a <Topic>, (list of <Qos> accepted), (list of <Retain> accepted), (range of <PayloadLength> accepted) OK | c—Defined Values

| | |
|---|---|
| <Topic> | This string identifies the information channel on which text data were published. Maximum length = 64 characters |
| <Qos> (0-2) | Quality of service |
| 0 | Once maximum - <Fire and Forget> |
| 1 | At least once - Delivery with acknowledgement of reception |
| 2 | Exactly once - Delivery guaranteed Default value = 0 |
| <Retain> (0-1) | Informs the broker that the message must be retained and sent to any new subscriber to |

-continued

| | |
|---|---|
| | this item as the initial message. Default value = 0 |
| <PayloadLength> | Maximum length of the message body. This value is limited by the value of the <OutBoxSize> parameter. If the value 0 is assigned to the <OutBoxSize> parameter, this value is no longer limited (see the +WSPGSET command section for further information about the <OutBoxSize> parameter). | d—Possible Error Codes

| | |
|---|---|
| +WSP ERROR 4000 | Non-activated function of the Wavecom SCADA protocol. This error is returned when the function of the Wavecom SCADA protocol has not been activated in the WISMO module. |
| +WSP ERROR 4001 | Illegal operation. This error is returned when an incorrect parameter is detected. |
| +WSP ERROR 4002 | Operation not accepted by the current configuration. | e—Informative Examples

| Command | Responses |
|---|---|
| AT + WSPWMS = My Will Topic", 0, 0<br>Note: Enters will information without the body length | ><br>Note: wait for the end of the text defined by <ctrl>P<ctrl>C |
| My body will message fr<br>Test <ctrl>P <ctrl>C<br>Note: enter the text | OK<br>Note: text entered |
| AT + WSPWMS = "My Will Topic", 0, 10<br>Note: enters will information with an incorrect parameter (<Retain>) | +WSP ERROR: 4001<br>Note: illegal operation |
| AT + WSPWMS?<br>Note: Reads all information about the Will message | +WSPWMS:<br>"My Will Topic", 0.0<br>My body will message test<br>OK<br>Note: the connection is set up with the broker |
| AT+XSPWMS=?<br>Note: possible values | +WSPWMS:64, (0-2), (0-1), 32767<br>OK |

Note:
if the <ctrl>P command is present in the text, the <ctrl>P <ctrl>P escape command will have to be used.

3.5—General Commands 3.5.1—Definition of the WSP+WSPDCONT Context a—Description

This command defines parameter values for a WSP context identified by the local context identification parameter <WSPCid>.

A maximum of two WSP contexts can be defined.

A special form of the defined command, +WSPDCONT=<WSPCid>, is used to delete a WSP context.

b—Syntax

| Command | Possible responses |
|---|---|
| AT + WSPDCONT = <WSPCid>[, [<Clientid>], [<broker_Adr>], [<Port>], [<CleanStart_Flag>], [<KeepAliveTimer>], [<UseLWT_Flag>]]<br>Note: creates a new context | OK<br>+WSP ERROR: 4000<br>+WSP ERROR: 4001 |
| AT+WSPDCONT?<br>Note: lists all created contexts | +WSPDCONT: <WSPCid1>, <Clientid1>, <Broker_Addr1>, <Port1>, <CleanStart_Flag1>, <KeepAliveTimer1>, <UseLWT_Flag1>, +WSPDCONT:<WSPCid2>, <Clientid2>, <Broker_Addr2>, <Port2>, <CleanStart_Flag2>, <KeepAliveTimer2>, <UseLWT_Flag2>, OK |
| AT+WSPCONT=?<br>Note: possible values | +WSPCONT: (list of <WSPCid> accepted), (max length of <Clientid>, (max length of<Broker_Addr>), (range of <Port> accepted), (list of <CleanStart_Flag> accepted), (list of <KeepAliveTimer> accepted), (list of <UseLWT_Flag> accepted).<br>OK | c—Defined Values

| | |
|---|---|
| <WSPCid> (1-2) | WSP context identifier: numeric parameter that indicates a definition of a given WSP context. |
| <Clientid> | Client identifier for the Wavecom SCADA protocol: string parameter that identifies the client.<br>Maximum length = 23 characters<br>Default value = unreadable |
| <Broker_Addr> | Parameter on string (or IP address) that identifies the broker server and provides a means of reaching it.<br>Maximum length = 255 characters<br>Default value = unreadable |
| <Port> (0-65535) | Numeric parameter (broker port) used to reach the broker server to transfer data.<br>Default values = 1883 |
| <CleanStart_Flag> (0-1)<br>0<br>1 | The client continues with the previous connection data.<br>The broker cancels all pending messages for the client, deletes all client subscriptions and reassigns the value 1 to the message ID.<br>Default value = 0 |
| <KeepAliveTimer> (0-32767) | Maximum interval between each client message.<br>The value 0 indicates that no connection holding (KeepAlive) timeout processing is made<br>Default value = 0 |
| <UseLWT_Flag> (0-1)<br>0<br>1 | Indicates if the Will message is used:<br>The Will message is not used<br>The Will message is used<br>Default value = 0 | d—Possible Error Codes

| | |
|---|---|
| +WSP ERROR 4000 | Non-activated function of the Wavecom SCADA protocol. This error is returned when the function of the Wavecom SCADA protocol has not been activated in the WISMO module. |
| +WSP ERROR 4001 | Illegal operation. This error is returned when an incorrect parameter is detected. | e—Informative Examples

| Command | Possible responses |
|---|---|
| AT + WSPDCONT = 1,1."1.2.3.4",1883,1.0.1<br>Note: creates a new context | OK<br>Note: context created |
| AT + WSPDCONT = 2,1,"5,6,7,8"<br>Note: creates a new context with default parameters | OK<br>Note: context created |
| AT + WSPDCONT = 2<br>Note: deletes a context | OK<br>Note: context deleted |
| AT + WSPDCONT = 10,1,"1.2.3.4"1883<br>Note: creates a new context with an incorrect parameter (Cid) | +WSP ERROR:4001<br>Note: illegal operation |
| AT + WSPDCONT = 2,1,"5,6,7,8"<br>Note: creates a new context with default parameters | OK<br>Note: context created |
| AT + WSPDCONT?<br>Note: lists all created contexts | +WSPDCONT:1,1,"1.2.3.4",1883,1,0,1<br>+WSPDCONT:2,1,"5.6.7.8",1883,1,0,1<br>OK |
| AT+WSPDCONT?<br>Note: possible values | +WSPDCONT:(1-2),23,255,<br>(0-06535),(0-1),(0-32767),(0-1)<br>OK |

3.5.2 +WSPCONM Connection Management a—Description

This command manages the connection to a broker.

b—Syntax

| Command | Possible responses |
|---|---|
| AT + WSPCONM = <Mode><br>[,<WSPCid><br>[,<CleanDisconnect>]]<br>Note: connection/disconnection operations | OK<br>Or<br>Error codes:<br>+WSP ERROR:4000<br>+WSP ERROR:4001<br>+WSP ERROR:4003<br>…<br>+WSP ERROR:40010 |
| AT+WSPCONM?<br>Note: returns the connection status | +WSPCONM:<Status> [,<WSPCid>]<br>OK |
| AT + WSPCONM = ?<br>Note: possible values | +WSPCONM: (list of <Mode> accepted),<br>(list of WSPCid> accepted),<br>(list of <CleanDisconnect> accepted)<br>OK | c—Defined Values

| | | |
|---|---|---|
| <Mode> (0-1) | 0 | Disconnection of an active Wavecom SCADA protocol session |
| | 1 | Connection to the remote broker |
| | 2 | Connection aborted |
| <WSPCid> | | WSP context identifier: numeric parameter that identifies the definition of a given WSP context. |
| <CleanDisconnect> (0-1) | | Disconnection mode |
| | 0 | Disconnection takes place immediately, the queue is emptied and all in-progress transactions are deleted. |
| | 1 | All queued messages (waiting or pending) are processed before the disconnection.<br>Default value = 1 |
| <Status> (0-2) | | Connection status with the broker. |
| | 0 | Not connected |
| | 1 | Connected |
| | 2 | Connection pending | d—Possible Error Codes

| | |
|---|---|
| +WSP ERROR 4000 | Non-activated function of the Wavecom SCADA protocol. This error is returned when the function of the Wavecom SCADA protocol has not been activated in the WISMO module. |
| +WSP ERROR 4001 | Illegal operation. This error is returned when an incorrect parameter is detected. |
| +WSP ERROR 4003 | WSP context not defined |
| +WSP ERROR 4004 | Client already connected |
| +WSP ERROR 4005 | Connection pending |
| +WSP ERROR 4006 | Disconnection pending |
| +WSP ERROR 4007 | Client not connected. This error is sent when a disconnection is requested whereas the ME is not connected |
| +WSP ERROR 4008 | No network |
| +WSP ERROR 4009 | No GPRS |
| +WSP ERROR 40010 | No TCP/IP | e—Informative Examples

| Command | Possible responses |
|---|---|
| AT + WSPCONM?<br>Note: obtains the current status of the connection | +WSPCONM:0<br>OK<br>Note: the module is not connected to the broker. |
| AT + WSPCONm=1,1<br>Note: connection operation with WSP1 context | OK<br>Note: connection operation started |
| AT + WSPCONM?<br>Note: obtains the current status of the connection | +WSPCONM:2,1<br>OK<br>Note: connection operation pending |
| AT + WSPCONM = 1,2<br>Note: another connection is requested | +WSP ERROR: 4004<br>Note: operation not managed |
| AT + WSPCONM?<br>Note: obtains the current status of the connection | +WSPCONM:1,1<br>OK<br>Note: the connection is set up with the broker |
| AT + WSPCONM = 0,0<br>Note: disconnection with reset of queues | OK |
| AT + WSPCONM = ?<br>Note: possible values | +WSPCONM:(0-1),(1-2),(0-1)<br>OK |

3.5.3—Send Message +WSPSMSG a—Description

This command sends or obtains the status of several message types, and particularly Publish, Subscribe and Unsubscribe.

The specification of the Wavecom SCADA protocol enables a SUBSCRIBE/UNSUBSCRIBE message to send several subscriptions/unsubscriptions. The limit for this AT command is fixed at one item per SUBSCRIBE/UNSUBSCRIBE message. In this case, an application that wants to subscribe/unsubscribe from several items will send several SUBSCRIBE/UNSUBSCRIBE requests for a single item.

b—Syntax

| Command | Possible responses |
| --- | --- |
| AT + WSPSMSG = <ActionType> [,<Param1> [,<Param2> [,<Param3> [,<Param4> [,<Param5> [,<Param6>]]]<CR><br>Note: configures all message parameters | When a message is sent<br>+WSPSMSG: <MsgHandle><br>OK<br>Or<br>When a message status is requested |
| | +WSPSMSG: <Status><br>OK<br>Or<br>Error code:<br>+WSP ERROR:4000<br>+WSP ERROR:4001<br>+WSP ERROR:4007<br>+WSP ERROR:40011 |
| AT + WSPSMSG?<br>Note: no effect | OK |
| AT + WSPSMSG = ?<br>Note: possible values | +WSPSMSG:<br>(list of <ActionType> managed)<br>OK | c—Defined Values

| <ActionType> | Operation type |
| --- | --- |
| 0 | Send a message |
| 1 | Obtain the message status |

*Send a message (5 parameters) - ActionType = 0*

| Generic parameter | Context parameter | Description | Format | Specifications | Default value |
| --- | --- | --- | --- | --- | --- |
| <Param1> | <MsgType> | Message identifier | Numeric | (3, 8, 10)<br>3 Publish<br>8 Subscribe<br>10 Unsubscribe | NA |
| <Param2> | <Topic> | String indicating the information channel on which text data are sent | Alphanumeric string | Maximum length 64 | ** |
| <Param3> | <QoS> | Quality of Service | Numeric | (0-2)<br>0 - Fire and forget<br>1 - Delivery with acknowledgement of reception<br>2 - Delivery guaranteed | 0 |
| <Param4> | <Retain> | Notifies the broker that the message must be kept and must be sent as the initial message to any new subscriber to this item | Numeric | (0-1) | 0 |
| <Param5> | <DupFlag> | Double indicating message used only if OutBoxSize = 0 | Numeric | (0-1)<br>0 - first send<br>1 - duplicated message | 0 |

-continued

**\* Send a message (5 parameters) - ActionType = 0**

| Generic parameter | Context parameter | Description | Format | Specifications | Default value |
|---|---|---|---|---|---|
| <Param6> | <PayLoadLength> | Maximum length of the message body | Numeric | (*) | 0** |

(*) Maximum length of the message body. This value is limited by the value of the <OutBoxSize> parameter. If the value 0 is assigned to the <OutBoxSize> parameter, there is no limit (see the +WSPGSET command section for further information about the <OutBoxSize> parameter).

Note: if MsgType=10 (UNSUBSCRIBE), then only the <Topic> parameter is compulsory.

Else, if MsgType=8 (SUBSCRIBE) then the <Topic> and <QoS> parameters are used. If the <QoS> parameter is activated, then the default value is used.

Else, if MsgType=3 (PUBLISH) then all parameters are used. If the <QoS> and <Retain> parameters are omitted, the default values are used.

Then, assign the number of bytes indicated by the <PayLoadLength> parameter to the <Payload> parameter.

Or

Enter <PayLoad> <Ctrl >P <Ctrl >C when the <PayLoadLength> parameter is omitted.

**\* Obtain the status (1 parameter) - ActionType = 1**

| Generic parameter | Context parameter | Description | Format | Specifications | Default value |
|---|---|---|---|---|---|
| <Param1> | <MsgHandle> | Numeric. Identifies the message | Numeric | (0-32767) | NA |

| <Status> | Message status |
|---|---|
| W | WAITING. The message is queued, the transaction has not begun. |
| P | PENDING. The message is queued. The transaction is in progress. |
| N | Message cannot be found. The message is not in the queue. Either the transaction is terminated, or the message was never put in a queue. | d—Possible Error Codes

| | |
|---|---|
| +WSP ERROR 4000 | Non-activated function of the Wavecom SCADA protocol. This error is returned when the function of the Wavecom SCADA protocol has not been activated in the WISMO module. |
| +WSP ERROR 4001 | Illegal operation. This error is returned when an incorrect parameter is detected. |
| +WSP ERROR 4007 | Client not connected. |
| +WSP ERROR 40011 | Queue saturated | e—Informative Examples

| Command | Possible responses |
|---|---|
| AT + WSPSMSG=0,3. "My Publish Topic",0,0,0<br>Note: publishes a message<br>My body publish message for test<br><Ctrl>P <Ctrl>C<br>Note: enter the Payload parameter | ><br>Note: waits for the end of the text identified by <Ctrl>P <Ctrl>C<br>+WSPSMSG:1<br>OK<br>Note: the message is in the internal queue or has been sent (if the internal queue is not used) |
| AT + WSPSMSG = 1,1<br>Note: obtains the message 1 status | +WSPSMSG:W<br>OK<br>Note: message |
| AT + WSPSMSG=0,3. "My Publish Topic" 0,10,0<br>Note: enter the Publish message with an incorrect <Retain> parameter | +WSP ERROR: 4001<br>Note: illegal operation |
| AT + WSPSMSG = 0,8. "My Subscribe Topic"<br>Note: Subscribe message in which the default value of the <QoS> parameter is used | +WSPSMSG:2<br>OK<br>Note: the message is in the internal queue or has been sent (if the internal queue was not used) |
| AT + WSPSMSG = 0,10, "My Unsubscribe Topic"<br>Note: Unsubscribe message | +WSPSMSG:3<br>OK<br>Note: the message is in the internal queue or has been sent (if the internal queue was not used) |
| AT + WSPSMSG?<br>AT + WSPSMSG=?<br>Note: possible values | OK<br>+WSPSMSG:(0,1)<br>OK |

Notes:
[1] If there is a <Ctrl>P in the text, the <Ctrl>P <Ctrl>P escape command has to be used.
[2] The <MsgHandle> parameter is only managed if the value 32767 bytes is assigned to the <OutBoxSize> parameter (see the General parameters section, +WSPGSET command).

When the value 0 is assigned to the <OutBoxSize> parameter, the <MsgHandle> parameter is set equal to the value 1 each time.

3.5.4—Reception of the +WSPRMSG Message a—Description

This command is used to read a received message. The message is received with the +WSPIMSG indication.

The broker can send a PUBLISH message to the client on any item to which the client is subscribed. This AT command is used to obtain messages arrived in the InBox queue.

This AT command is only available if the value 0 is not assigned to the <InboxSize> parameter (see general parameters, +WSPGSET command). If the value 0 is assigned to the <InboxSize> parameter, messages are displayed with the +WSPIRMSG indication.

b—Syntax

| Command | Possible responses |
|---|---|
| AT + WSPRMSG = <Msgid>[,<Mode>]<br>Note: receives a message from the Inbox queue | +WSPRMSG:<Msgid>[,<Topic> [,<Dup>[,<QoS> [,<Retain>[,DataLength>]]]]]<CR><LF><Data>OK<br>Or<br>Error codes:<br>+WSP ERROR:4000<br>+WSP ERROR:4001<br>+WSP ERROR:4002<br>+WSP ERROR:40012 |
| AT + WSPRMSG?<br>Note: sends the list of messages in the Inbox queue | +WSPRMSG: <Msgid1><br>...<br>+WSPRMSG: <Msgidn><br>OK |
| AT + WSPRMSG = ?<br>Note: possible values | +WSPRMSG: (range of <Msgid> accepted), (list of <Mode> accepted)<br>OK | c—Defined Values

| | |
|---|---|
| <Msgid> (0-32767) | Received message identifier |
| <Mode> (0-1) | Reception mode |
| 0 | Output terminated (by <ctrl>P <ctrl>C) without the header (DUP, QoS, Retain, etc.) |
| 1 | Output terminated and header displayed | d—Possible Error Codes

| | |
|---|---|
| +WSP ERROR 4000 | Non-activated function of the Wavecom SCADA protocol. This error is returned when the function of the Wavecom SCADA protocol has not been activated in the WISMO module. |
| +WSP ERROR 4001 | Illegal operation. This error is returned when an incorrect parameter is detected. |
| +WSP ERROR 4002 | Operation not managed by the current configuration. |
| +WSP ERROR 40012 | Message cannot be found | e—Informative Examples

| Command | Possible responses |
|---|---|
| AT + WSPRMSG?<br>Note: obtains the list of messages appearing in the InBox queue | +WSPCONM:8<br>OK<br>Note: there is a message in the InBox |
| AT + WSPRMSG = 8,3<br>Note: obtains the message with an incorrect <Mode> parameter. | +WSP ERROR: 4001<br>Note: illegal operation |
| AT + WSPRMSG = 8,1<br>Note: obtains the message with the associated header | +WSPRMSG=8, "Topic Test",1,0,1,20<br>Receive Message test<CR> <LF> OK<br>OK<br>Note: connection operation started |
| AT + WSPRMSG?<br>Note: obtains the current status of the connection | OK<br>Note: there is no message in the InBox |
| AT + WSPRMSG = 10,2<br>Note: obtains the message with the associated header | +WSP ERROR: 4012<br>Note: message cannot be found |
| AT + WSPRMSG?<br>Note: possible values | +WSPRMSG: (0-32767),(0-2)<br>OK |

3.5.5 +WSPPA Protocol Administration a—Description

This command makes a general reset in the various queues or restores the default values of all parameters.

b—Syntax

| Command | Possible responses |
|---|---|
| AT + WSPPA = <ActionType><br>Note: performs an action | OK<br>Or<br>Error codes:<br>+WSP ERROR: 4000<br>+WSP ERROR: 4001<br>+WSP ERROR: 4002 |
| AT + WSPPA?<br>Note: no effect. | OK |
| AT + WSPPA = ?<br>Note: possible values | +WSPPA: (range of <Action> handled)<br>OK | c—Defined Values

| | |
|---|---|
| <ActionType>(0-1) | Action type |
| 0 | RESET. Empties the queue and interrupts all transactions in progress. |
| 1 | DEFAULT PARAMETERS. All default values of parameters of AT commands are restored. This action is only possible when not connected. | d—Possible Error Codes

| | |
|---|---|
| +WSP ERROR 4000 | Non-activated function of the Wavecom SCADA protocol. This error is returned when the function of the Wavecom SCADA protocol has not been activated in the WISMO module. |
| +WSP ERROR 4001 | Illegal operation. This error is returned when an incorrect parameter is detected. |
| +WSP ERROR 4002 | Operation not accepted by the current configuration. | e—Informative Examples

| Commands | Possible responses |
|---|---|
| AT + WSPPA = 0 | OK |
| Note: empties all queues and interrupts all transactions in progress. | Note: reset done. |
| AT + WSPPA = 2 | +WSP ERROR: 4001 |
| Note: perform an action with an incorrect <ActionType> parameter | Note: illegal operation |
| AT + WSPPA? | OK |
| Note: no effect | |
| AT + WSPPA = ? | +WSPPA: (0-1) |
| Note: possible values | OK |

3.6 WSP Indications

This chapter describes all event responses for sent messages.

3.6.1 +WSPDCONI Connection Indications

A connection indication mechanism (+WSPCONI) is set up so that the external application can determine the connection status.

These indications are sent when a value between 1 and 3 is assigned to the <NotifyLevel> parameter (see the +WSPGSET command).

```
Syntax: +WSPCONI: <Status>
    <Status>
0   The requested disconnection is terminated
1   The connection with the broker is set up
2   The connection with the broker is refused
3   Protocol version not handled
4   Identifier rejected by the broker
5   Will message configuration necessary. This indication is returned
    only when the +WSPWMS command was not configured before the
    connection.
6   Allocated time for configuration of the Will message exceeded.
    Connection not set up.
```

3.6.2 +WSPSMSGI Message Send Indications

A (+WSPSMSGI) message indications mechanism is set up so that the external application can determine if the message is received or if a message has been sent.

These indications are sent when the value 2 or 3 is assigned to the <NotifyLevel> parameter (see the +WSPGSET command) and if the value 32767 is assigned to the <InboxSize> parameter.

```
Syntax: + WSPSMSGI: <Status>,<Msgid>
    <Status>
0   The <Msgid> message has been distributed (QoS>0)
1   The <Msgid> message has been deleted (all attempts have failed)
    <Msgid>
    (0-32767)    Message identifier
```

3.6.3 +WSPRMSGI Message Reception Indications

If the Inbox size (<InboxSize>) is zero (0), messages are displayed with the +WSPRMSGI indication as soon as they are received.

These indications are sent when the value 2 or 3 is assigned to the <NotifyLevel> parameter (see +WSPGSET command) and when the value 0 is assigned to the <InboxSize> parameter.

The message header and/or the payload are displayed as a function of the +WSPGSET RecMsgMode parameter.

```
Syntax: +WSPRMSGI: <Status>[, <Msgid>[, <Topic>, <Dup>, <QoS>,
<Retain>, <Length> <CR> <LF>
    <Data>]]
    <Status>
        0  <WMsgid> message received in the Inbox
        1  Message received. The message is sent directly to the output.
        2  Inbox saturated
        3  No message reception capacity
        4  Message terminated
        5  Incorrect message
    <Msgid>   (0-32767)      Received message identifier
    <Topic>                  Message item string
    <Dup>     (0-1)          Double indicator (for QoS 1 and 2)
    <QoS>     (0-2)          Quality of Service for this message
    <Retain>  (0-1)          Memorisation indicator (Retain)
    <Length>  (0-Outbox size)
                             Payload length
    <Data>    Message data
```

3.7 Error Codes

This chapter describes all error codes returned by WSP AT commands.

| Error code | Meaning |
|---|---|
| +WSP ERROR: 4000 | Non-activated function of the Wavecom SCADA protocol. This error is returned when the function of the Wavecom SCADA protocol has not been activated in the WISMO module. |
| +WSP ERROR: 4001 | Illegal operation. This error is returned when an incorrect parameter value has been used. |
| +WSP ERROR: 4002 | Operation not handled by the current configuration. |
| +WSP ERROR: 4003 | WSP context not defined |
| +WSP ERROR: 4004 | Client already connected |
| +WSP ERROR: 4005 | Connection operation pending |
| +WSP ERROR: 4006 | Disconnection operation pending |
| +WSP ERROR: 4007 | Client not connected |
| +WSP ERROR: 4008 | No network |
| +WSP ERROR: 4009 | No GPRS |
| +WSP ERROR: 40010 | No TCP/IP |
| +WSP ERROR: 40011 | Queue saturated |
| +WSP ERROR: 40012 | Message cannot be found |
| +WSP ERROR: 40013 | Connection refused by the broker |
| +WSP ERROR: 40014 | Connection refused due to a protocol version not handled |
| +WSP ERROR: 40015 | Connection refused: identifier rejected by the broker |

4. Examples

This section gives examples of the use of all AT commands in the Wavecom SCADA protocol described above. These examples are shown in FIGS. 3A to 3K respectively.

In these figures, the information is presented using a format well known to those skilled in the art, clearly showing data exchanges between the various entities (server or broker, module and external application. The fourth column shows which commands are used, and their meaning when applicable.

It does not seem necessary to add further comments on these figures, those skilled in the art will be capable of interpreting them directly.

Figure 3A:
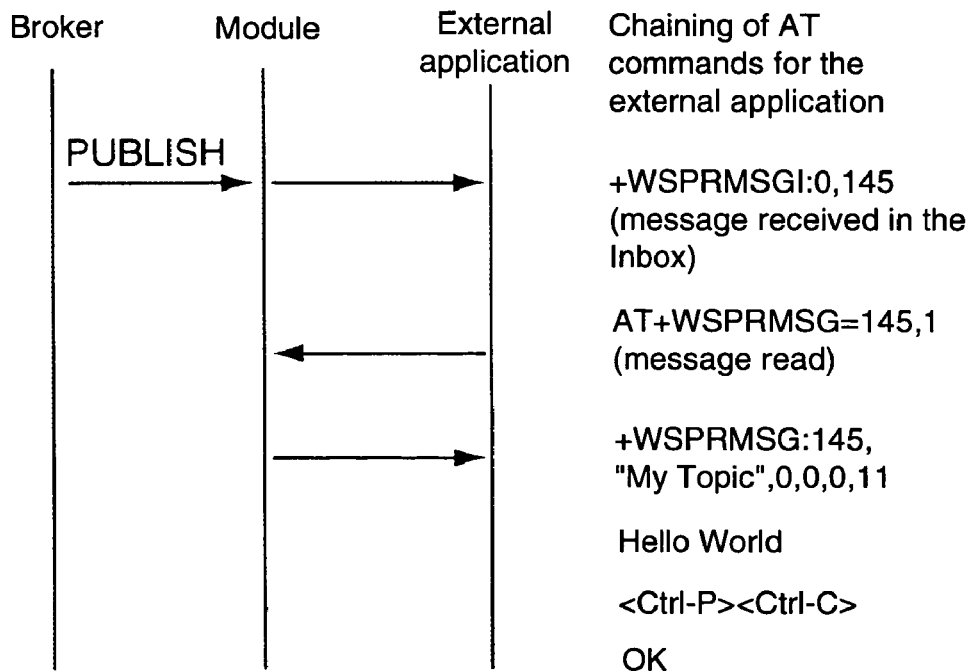
FIGS. 3A to 3L show different example embodiments of a connection according to embodiments of the invention.
Figure 3B:
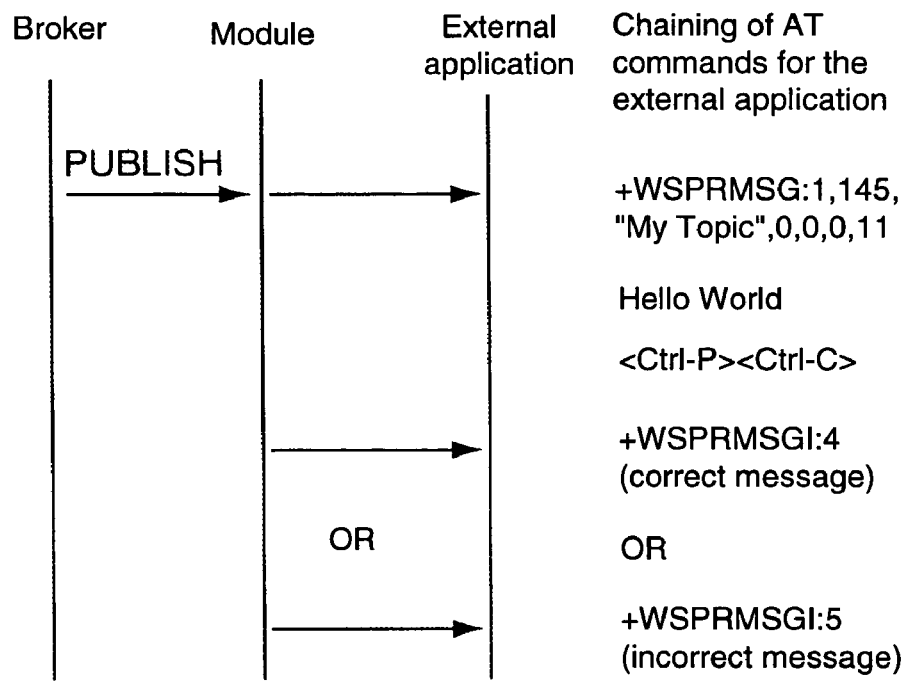
Figure 3C:
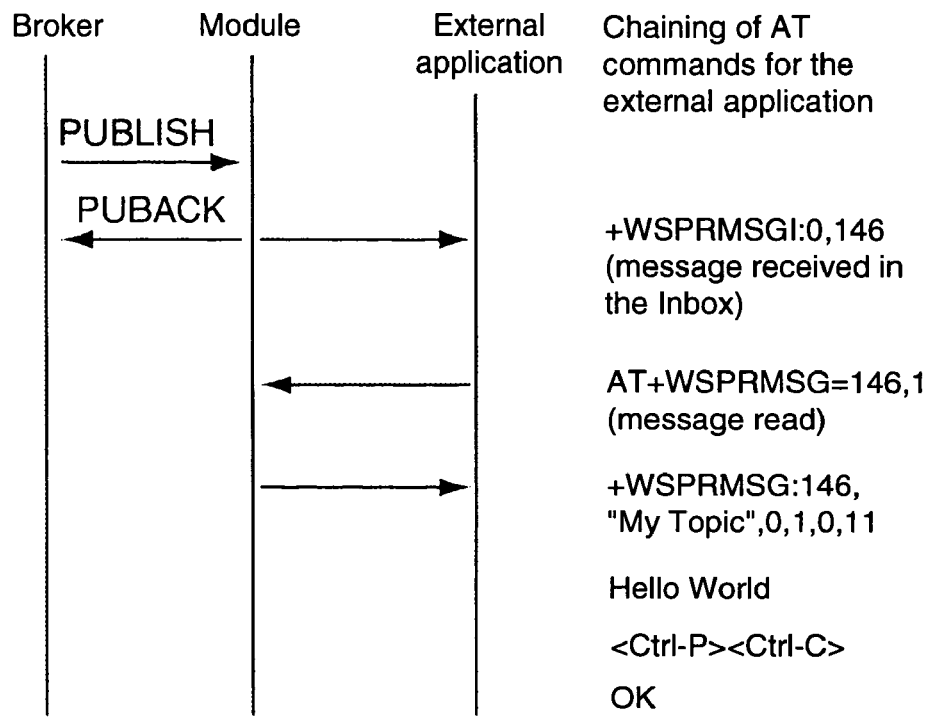
Figure 3D:
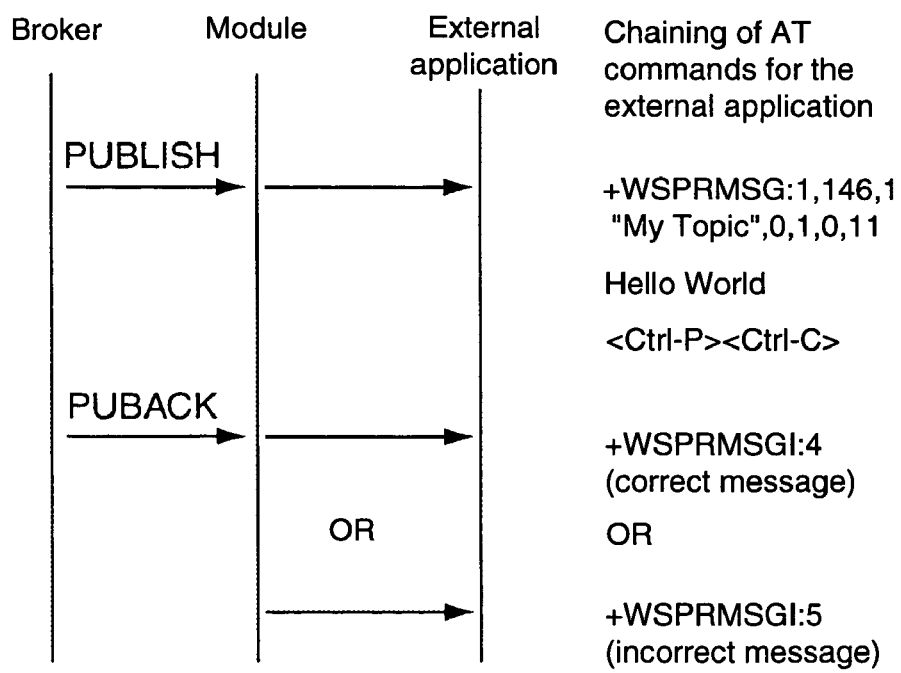
Figure 3E:
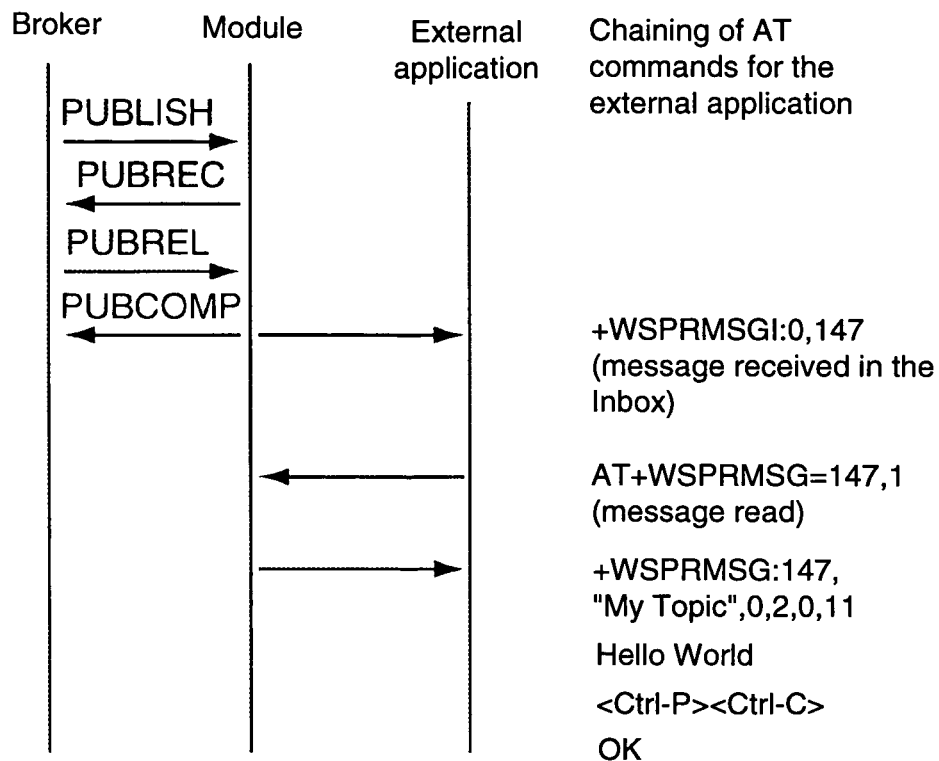
Figure 3F:
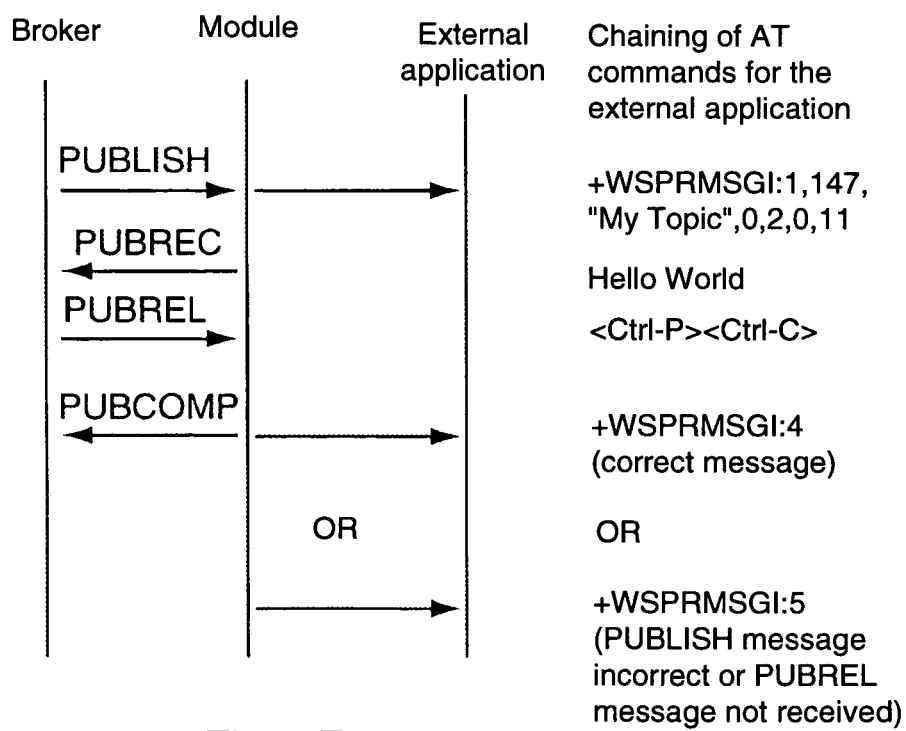
Figure 3G:
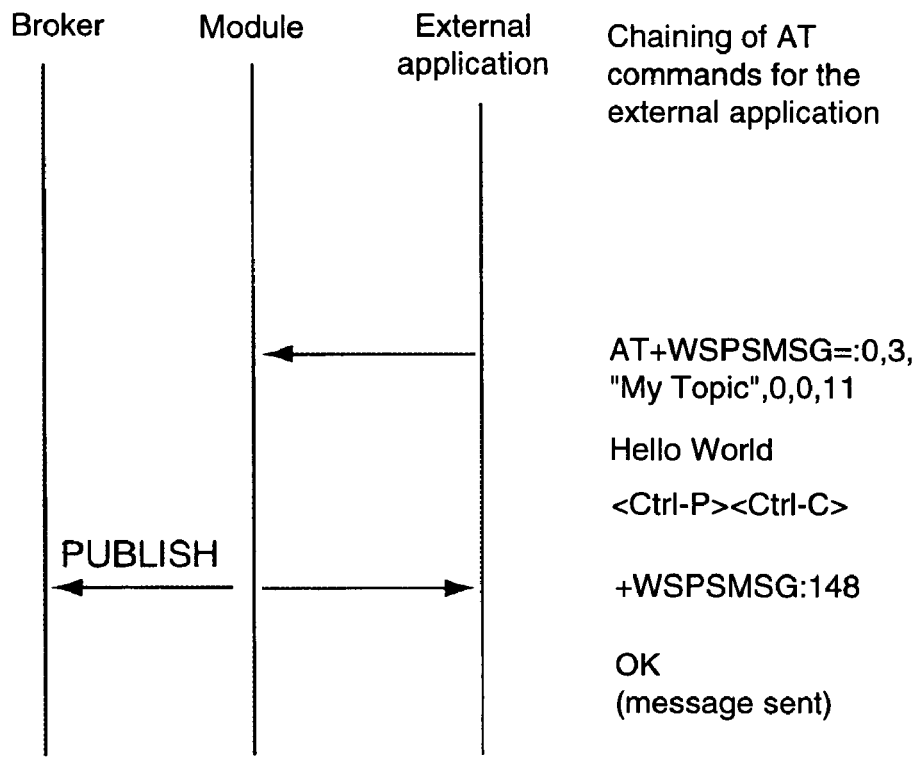
Figure 3H:
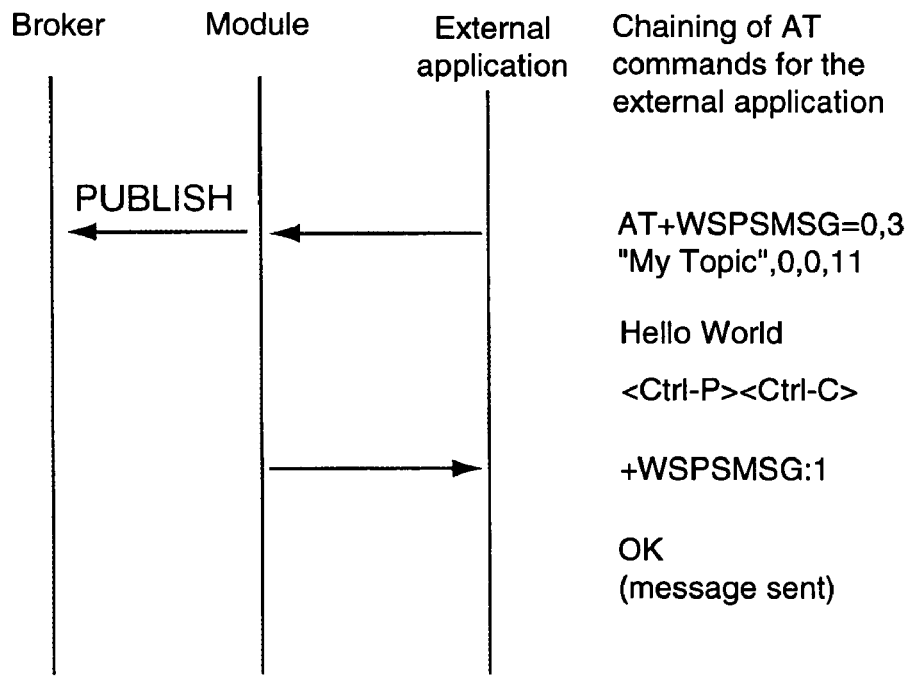
Figure 3I:
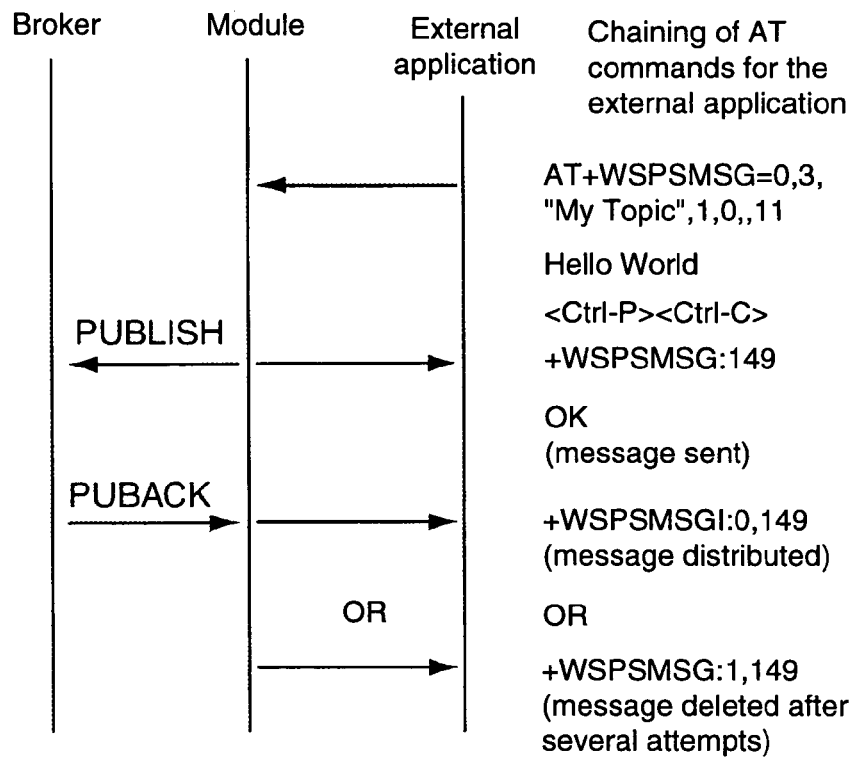
Figure 3J:
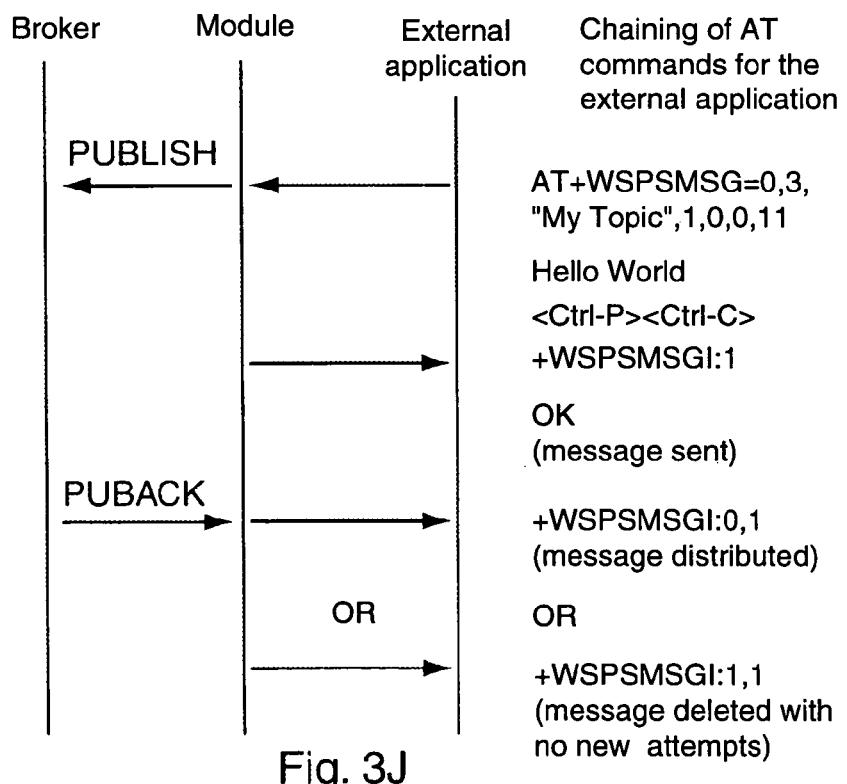
Figure 3K:
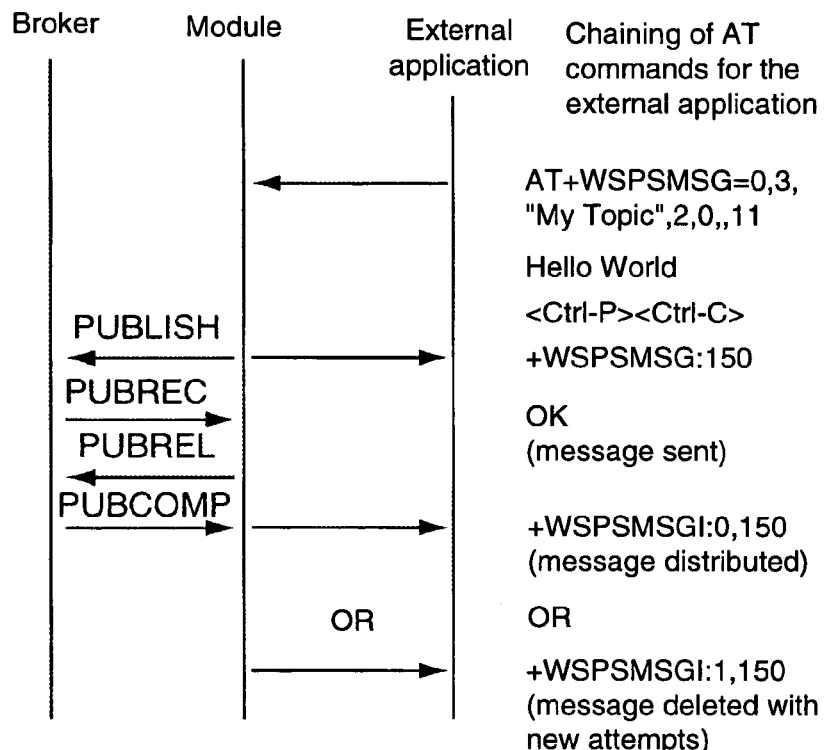
Figure 3L:
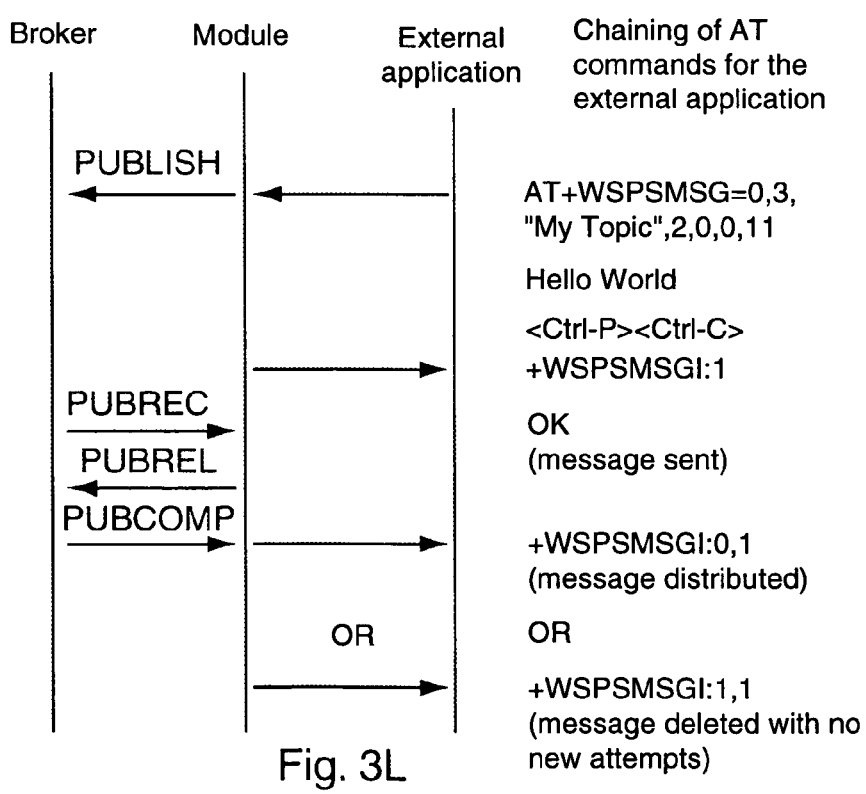

The following aspects are presented:
4.1 Receiving a message with QoS 0
4.1.1 With an Inbox (FIG. 3A)
4.1.2 Without an Inbox (FIG. 3B)
4.2 Receiving a message with QoS 1
4.2.1 With an Inbox (FIG. 3C)
4.2.2 Without an Inbox (FIG. 3D)
4.3 Receiving a message with QoS 2
4.3.1 With an Inbox (FIG. 3E)
4.3.2 Without an Inbox (FIG. 3F)
4.4 Sending a message with QoS 0
4.4.1 With an Outbox (FIG. 3G)
4.4.2 Without an Outbox (FIG. 3H)
4.5 Sending a message with QoS 1
4.5.1 With an Outbox (FIG. 3I)
4.5.2 Without an Outbox (FIG. 3J)
4.6 Sending a message with QoS 2
4.6.1 With an Outbox (FIG. 3K)
4.6.2 Without an Outbox (FIG. 3L)
4.7 Comments In these various figures, it can be seen that the external application does not need to know the MQIsdp protocol (PUBLISH, PUBREC, PUBREL, PUBCOM commands, etc.), all it needs to know are the AT commands described above.

The module makes the interface transparently. Programming of the module to make this interface is obvious, firstly from the specifications given above, and secondly from the specifications for the MQIsdp protocol.

Although the present invention has been described with reference to preferred embodiments, workers skilled in the art will recognize that changes may be made in form and detail without departing from the spirit and scope of the invention.

The invention claimed is:

1. System for remote control of equipment enabling interconnection between at least one server and at least one remote equipment, said at least one server carrying out the MQIsdp protocol, where MQIsdp represents an MQSeries Integrator SCADA Device Protocol, where SCADA represents Supervisory Control and Data Acquisition,
wherein the system associates, with said at least one remote equipment, radiocommunication means comprising:
sending and receiving means for exchanging specific Attention Commands (AT commands) sent by and/or to be sent to an external application used by said at least one remote equipment, wherein said specific AT commands comprise commands for:
connecting to said at least one server;
sending messages to said at least one server;
receiving messages from said at least one server;
communication means for exchanging data with said at least one server according to said MQIsdp protocol;
interface means for making an interface between said specific AT commands and said MQIsdp protocol, so as to enable an interconnection between said at least one server and said at least one remote equipment without requiring knowledge of said MQIsdp protocol in said at least one remote equipment;
and wherein, in at least a first mode, said radiocommunication means only manage signalling of a data exchange, said data being transferred directly from said at least one remote equipment to said at least one server, or vice versa.

2. System for remote control of equipment according to claim 1, wherein in at least a second mode, said radiocommunication means manage signalling of a data exchange and transfer of said data, the data being temporarily stored in at least one buffer memory.

3. System for remote control of equipment according to claim 2, wherein the size of said at least one buffer memory is parameterable.

4. System for remote control of equipment according to claim 3, wherein the system operates in said first mode when the size of said at least one buffer memory is equal to 0, and otherwise in said second mode.

5. System for remote control of equipment according to claim 1, wherein said radiocommunication means comprise a radiocommunication module comprising all radio frequency and base band data processing means on the same substrate, together with means of managing said specific AT commands.

6. System for remote control of equipment according to claim 1, wherein said radiocommunication means include said MQIsdp protocol in the form of an "open-AT" application defining said specific AT commands.

7. System for remote control of equipment according claim 1, wherein at least some of said specific AT commands are organized so as to be able to perform at least two functions and/or to act on at least two distinct aspects, as a function of a predefined configuration.

8. System for remote control of equipment according claim 1, wherein said specific AT commands only includes 8 commands.

9. System for remote control of equipment according to claim 1, wherein said specific AT commands includes a configuration command used to define communication parameters with said at least one server.

10. System for remote control of equipment according to claim 9, wherein the system uses a single configuration command (+WSPGSET) for configuration of radiocommunication aspects and the general configuration of aspects related to the MQIsdp protocol.

11. System for remote control of equipment according to claim 8, wherein said configuration command can be used to select one of at least two transmission modes (GSM or GPRS).

12. System for remote control of equipment according to claim 1, wherein the system uses three configuration commands:
a general communication configuration command (+WSPGSET);
a connection configuration command (+WSPCSET), particularly used to specify the coordinates of said at least one server;
a configuration command for the "will" configuration message (+WSPWMS),
particularly to specify the channel to which a message will be sent.

13. System for remote control of equipment according to claim 1, wherein the system uses at least one general communication command for sending and/or receiving messages using the MQIsdp protocol.

14. System for remote control of equipment according to claim 13, wherein the system uses five general communication commands:
a command for specifying an MQIsdp context (+WSPDCONT);
a command for managing a connection with said at least one server (+WSPCONM);
a command for sending a message (+WSPSMSG);
a command for receiving a message (+WSPRMSG);

an administration command, used to do a reset and/or return to the default values of a set of parameters (+WSPPA).

15. System for remote control of equipment according to claim 1, wherein the system uses at least one query command by an external application.

16. System for remote control of equipment according to claim 15, wherein the system uses two query commands by an external application, on the following in turn:
the current state of the connection (+WSPICON);
reception and/or sending of a message (+WSPIMSG).

17. Device for remote control of equipment enabling interconnection between at least one server and at least one remote equipment, said at least one server carrying out the MQIsdp protocol, where MQIsdp represents an MQSeries Integrator SCADA Device Protocol, where SCADA represents Supervisory Control and Data Acquisition,
wherein the device associates, with said at least one remote equipment, radiocommunication means comprising:
sending and receiving means for exchanging specific AT commands sent by and/or to an external application used by said at least one remote equipment, wherein said specific AT commands comprise commands for:
connecting to said at least one server;
sending messages to said at least one server;
receiving messages from said at least one server;
communication means for exchanging data with said at least one server according to said MQIsdp protocol;
interface means for making an interface between said specific AT commands and said MQIsdp protocol, so as to enable an interconnection between said at least one server(s) and said at least one remote equipment, without requiring additional processing and/or data formatting means in said at least one remote equipment, and
wherein, in at least a first mode, said radiocommunication means only manage signalling of a data exchange, said data being transferred directly from said at least one remote equipment to said at least one server, or vice versa.

18. A radiocommunication device comprising radiocommunication means used in a system for remote control of equipment according to claim 1.

19. A radiocommunication module comprising radiocommunication means used in a system for remote control of equipment according to claim 1.

20. The system of claim 1, wherein the specific AT commands enable data exchange with said at least one server using said MQIsdp protocol.

* * * * *